US006405294B1

(12) United States Patent
Hayter (10) Patent No.: US 6,405,294 B1
(45) Date of Patent: Jun. 11, 2002

(54) DATA CENTER MIGRATION METHOD AND SYSTEM USING DATA MIRRORING

(75) Inventor: Jim Hayter, Colorado Springs, CO (US)

(73) Assignee: MCI Communications Corporation, Washington, DC (US)

(*) Notice: Subject to any disclaimer, the term of this patent is extended or adjusted under 35 U.S.C. 154(b) by 1038 days.

(21) Appl. No.: 08/581,721

(22) Filed: Dec. 29, 1995

(51) Int. Cl.[7] .............................................. G06F 13/14
(52) U.S. Cl. .......................................... 711/162; 714/5
(58) Field of Search ................... 395/439, 489, 395/182.03, 182.04, 200.09

(56) References Cited

U.S. PATENT DOCUMENTS

| 5,537,533 A | * | 7/1996 | Staheli et al. | 395/182.03 |
| 5,544,347 A | * | 8/1996 | Yanai et al. | 395/489 |
| 5,574,950 A | * | 11/1996 | Hathorn et al. | 395/200.09 |
| 5,592,618 A | * | 1/1997 | Micka et al. | 395/489 |
| 5,623,599 A | * | 4/1997 | Shomler | 395/182.16 |

FOREIGN PATENT DOCUMENTS

| EP | 0 566 966 A2 | 10/1993 |
| EP | 0 602 822 A2 | 6/1994 |
| EP | 0 670 551 A1 | 9/1995 |
| GB | 2 273 180 A | 6/1994 |
| WO | 94/00816 | 1/1994 |
| WO | 94/25919 | 11/1994 |

OTHER PUBLICATIONS

"Concurrent Copy System Components," IBM Technical Disclosure Bulletin, vol. 37, No. 04B, Apr. 1994, pp. 145–147.

* cited by examiner

Primary Examiner—Do Hyun Yoo
Assistant Examiner—Gary J. Portka (57) ABSTRACT

A method and system for migrating computer applications and volumes of data from a source DASD connected to a source computer system to a target DASD connected to a target computer system. The method comprises ensuring data integrity on the source DASD, initiating one or more processes to mirror all data and all data updates from the source DASD to the target DASD, ensuring synchronization of data updates to the source DASD by the source computer system with data updates to the target DASD, deactivating all applications executing on the source computer system, mirroring one or more remaining data updates to the source DASD by the source computer system to the target DASD, disconnecting the source computer system and the source DASD from the target computer system and the target DASD; and bringing the target computer system and the applications executing on the target computer system on-line.

3 Claims, 3 Drawing Sheets

DATA CENTER MIGRATION METHOD AND SYSTEM USING DATA MIRRORING

BACKGROUND OF THE INVENTION

1. Field of the Invention

This invention relates to data center migration, and more specifically to a platform for migrating computer mainframe applications and volumes of data from a source Direct Access Storage Device (DASD) to a remote target DASD.

2. Related Art

Businesses that offer technology, such as telecommunications, must deal with the necessity of collecting, storing, and managing large volumes of data on a daily basis. It is common for such companies to utilize several mainframe computers located in various facilities known as data centers.

These data centers are strategically placed in geographical locations, taking into consideration such aspects as data network topology, user proximity, local real estate markets and economy, local employment base, and survivability of natural disasters. Often, strategic direction requires a company to move a data center from one location to another, which consists of moving all data of a source mainframe to another remote target mainframe. Data to be moved includes system configuration, operating system, applications, support, and user data. Sometimes an entire mainframe is to be moved, while other situations dictate that only certain applications be moved.

In essence, moving a mainframe from one location to another consists of migrating data from a source Direct Access Storage Device (DASD) to a target DASD. These DASD units are physical devices used for permanent storage on mainframe computers. They store all data that are used by a mainframe computer, and, thus all data that must be moved as part of a data center migration. Therefore, a data center migration is essentially a migration of data from one DASD to another.

Migrating such large volumes of data requires several provisions to minimize business impact. Some aspects that must be considered are:

(i) Data integrity: Moving large volumes of mission-critical data exposes the business to data corruption. In addition to exposures due to the physical transfer of data, updates and changes made to data during the move may not be reflected at the target location;

(ii) Minimal application downtime: A business cannot be put on hold for the extended periods of time required for traditional data migrations. Minimizing application downtime during the move is critical for the users of the data center;

(iii) Cost: The cost of resources needed for a data center migration is a fundamental business concern. Minimizing the cost of resources such as data center equipment, transportation vehicle, and data transfer network is essential;

(iv) Manpower: People resources represent another cost of a data center migration. Minimizing the headcount needed is always a concern; and (v) Time: Reducing the amount of time needed for a data center migration reduces such liabilities as resource/manpower costs, application downtime, and data integrity exposures.

There are three (3) traditional methods of data center migration: Tape Backup and Ship, Tape Drive Channel Extension, and Physically Moving DASD Units.

a. Tape Backup and Ship

The Tape Backup and Ship method consists of backing up to tape all data on the source DASD. This is also known as tape dump-and-restore. All data on the source DASD are downloaded to magnetic tapes. The tapes are then shipped by truck, rail, or air to the site of the target DASD. When received, the tapes are loaded onto the tape drive of the target mainframe and all data are uploaded to the target DASD.

This method obviously requires a large number of magnetic tapes. For every one gigabyte (G.B.) of data to be migrated, approximately two (2) tapes are needed. This means for a typical migration of 2500 G.B., 5000 magnetic tapes are required.

Another major disadvantage of this method is the fact that customer applications must be down for the entire time it takes to download the data to tape, ship the tapes, and then upload the data to the target DASD. Table 1 below shows the approximate time (in minutes) it takes to backup data from a source DASD to tape, transport the tapes, and then restore the data to a target DASD. Time is indicated as a function of gigabytes to be migrated, and assumes eight (8) tape drives are used. An estimate of twelve (12) hours is used for transport time, assuming cross country air freight is used.

TABLE 1

| Gbs | Backup | Transport | Restore | Total Minutes | Total Hours |
|---|---|---|---|---|---|
| 100 | 200 | 720 | 200 | 1120 | 18.67 |
| 500 | 1000 | 720 | 1000 | 2720 | 45.33 |
| 1000 | 2000 | 720 | 2000 | 4720 | 78.67 |
| 1500 | 3000 | 720 | 3000 | 3000 | 112.00 |
| 2000 | 4000 | 720 | 4000 | 4000 | 145.33 |
| 2500 | 5000 | 720 | 5000 | 5000 | 178.67 |

One important disadvantage of this method is that all customer applications are inaccessible during this time. For example, during the migration of a data center consisting of 1000 G.B. using the Tape Backup and Ship method, all applications are down for approximately 3.28 days.

Another disadvantage of this method is the resources and associated costs needed to conduct the migration. Extra manpower is needed to perform the tape download and upload, and to physically move the tapes. Transportation of the tapes may incur significant costs, especially if it is over great distances and requires expedited delivery. Also, as indicated in Table 1 above, the cost of tapes may be high if a large amount of data is to be migrated.

Another disadvantage of this method is its exposure to data corruption. Due to the fact that the tapes serve as an intermediate medium, data may be corrupted during the downloading or uploading of data to and from the tapes. There also exists the possibility of tapes being lost or damaged during transportation and many exchanges of hands, or at least of tapes being placed out of sequence. Finally, unplanned application updates that are made during or after the source DASD download may not be reflected at the target DASD.

b. Tape Drive Channel Extension

The Tape Drive Channel Extension method consists of connecting a channel extender unit to the source mainframe tape backup system. The source mainframe treats the channel extender as a tape drive and writes data to the extender as data is being read from the source DASD. The channel extender unit then sends this data over a DS-3 Data Link connected to the target tape drive which writes the data to tapes at the target data center. The tapes must then be manually uploaded to the target DASD.

As with the Tape Backup and Ship method, this method obviously requires a large number of magnetic tapes. For every one (1) gigabyte (G.B.) of data to be migrated, approximately two (2) tapes are needed. This means for a typical migration of 2500 G.B., 5000 magnetic tapes are required.

Also as with the Tape Backup and Ship method, customers applications must be down and inaccessible for a significant period of time. Applications must be down during the backup (source mainframe writes DASD data to a channel extender unit,) and restore (tapes are uploaded to a target DASD) processes. However, there is no tape transport time needed, and the restore process may begin approximately one (1) hour after the backup process begins. Table 2 below shows the approximate time (in minutes) it takes to backup data at the source data center, and to restore data at the target data center. Time is indicated as a function of gigabytes to be migrated, and assumes eight (8) tape drives are used.

TABLE 2

| Gbs | Backup | Transport | Restore | Total Minutes | Total Hours |
|---|---|---|---|---|---|
| 100 | 250 | — | 60 | 310 | 5.17 |
| 500 | 1250 | — | 60 | 1310 | 21.83 |
| 1000 | 2500 | — | 60 | 2560 | 42.67 |
| 1500 | 2750 | — | 60 | 3810 | 63.50 |
| 2000 | 5000 | — | 60 | 5060 | 84.33 |
| 2500 | 6250 | — | 60 | 6310 | 105.17 |

As with the Tape Backup and Ship method, all customer applications are inaccessible during this time.

Another disadvantage of this method is the resources and associated costs needed to conduct the migration. Extra manpower is needed to perform the restore process at the target site. Also, as indicated in Table 2 above, the cost of tapes can be high if a large amount of data is migrated.

Finally, due to the fact that both tapes and channel extender units are serving as intermediate media, data may be corrupted during the backup or restore processes. Also, unplanned application updates that are made during or after the backup process may not be reflected at the target site.

c. Phsically Moving DASD Units

Physically Moving DASD Units consists of dismantling, transporting, and re-installing the source DASD units at the target data center.

The obvious disadvantage of this method is the exposure to physical damage that the DASD units have during the transportation process. This also comprises an exposure to data corruption if physical damage is incurred.

Another disadvantage of this method is that customer applications must be down for the entire time it takes to dismantle, transport, and re-install the DASD units. This time varies with the amount of available manpower and transportation resources.

Another disadvantage of this method is the cost of transportation and manpower needed to dismantle, transport, and re-install the DASD units.

In addition to the three (3) methods of data migration discussed above, there is product currently on the market that is used for a data center migration: Sterling Software's Network Data Mover (NDM). NDM is a mainframe system utility that transfers volumes of data over virtual terminal access method (VTAM) communication links between mainframe computers. VTAM is a standard mainframe terminal and network access communication link that is available from International Business Machine, Incorporated (IBM).

NDM, however, has several disadvantages. First, a major disadvantage of NDM is that it requires the target system to be configured prior to migrating the data. It also requires that data be moved on a dataset-by-dataset basis, rather than by moving entire volumes. This requires extensive manual support. Also, NDM requires that a new node identifier be established for the target system, since it will route the data based on the source and target systems' node identifiers. This prohibits a company from keeping old data center identifiers intact.

SUMMARY OF THE INVENTION

The present invention solves the problems described above by using a Symmetrix Remote Data Facility (SRDF) unit designed by EMC Corporation to perform data center migrations directly from a source DASD to a target DASD. EMC designed the SRDF unit to mirror data from a primary data center to a remote, target data center, thereby providing data redundancy for the purpose of real time disaster relief, or process recovery if the primary data center experiences an outage. Under this original design, the target data center is only brought 'on-line' if the primary data center experiences such an outage or goes 'off-line.'

The SRDF is a hardware unit connected to a Symmetrix DASD device. SRDF reads data as it is written from a source mainframe computer's memory to a source DASD unit. It then transfers this data from the source DASD over ESCON or DS-3 Data Link trunks to a second, target DASD unit, where the data is written for permanent storage. The target DASD is connected to a target mainframe computer system. This data transfer allows for data on the target DASD to mirror data on the source DASD unit, thereby providing data redundancy. As the source mainframe writes new data to the source DASD, it is automatically mirrored to the target DASD.

The benefit of using SRDF is that it is host transparent. Applications are mirrored from one data center to another while application processing continues. No additional host software is required for the mirroring process. The EMC SRDF units themselves manage all the data mirroring functions. Upon deactivating the applications on the source mainframe, they can be brought up on the target mainframe within a number of hours.

The conventional operation of SRDF, however, requires that data first be entered into the source mainframe system's memory prior to being written to the source DASD. Therefore, there is a time lag between when data is entered by the user, and when that data is mirrored on the target DASD. This time lag introduces an exposure when migrating data. At some point in time, use of an application must be cut over from the source mainframe to the target mainframe. Any data that is caught between the source mainframe's memory and the source DASD when this cutover occurs is not reflected on the target DASD.

The present invention, identified as a Data Center Migration Method and System Using Data Mirroring, uses the EMC's SRDF unit in a completely unique manner as defined by specific procedures. It migrates all system and application data from a primary data center to a remote target data center. Specific procedures are required to ensure data integrity is maintained and that all user updates made during the migration in the primary data center are reflected in the target data center.

Accordingly, no tapes or tape drive resources are necessary to utilize the present invention. This poses an advantage over both the Tape Backup and Ship method, and the Tape Drive Channel Extension method, in which thousands of tapes may be required.

It is another advantage of the present invention that application downtime is greatly reduced from traditional methods. Since no backup to tape, transportation, or restore to target system is needed, customer applications are down only for a sixty (60) minute window in which processing is transferred from one data center to another. Table 3 below compares total hours needed for data migration, as a function of gigabytes, among the first two traditional methods and the present invention:

TABLE 3

| Gbs | Tape Backup/Ship Total Hours | Tape Drive Channel Ext Total Hours | SRDF Data Migration Total Hours |
| --- | --- | --- | --- |
| 100 | 18.67 | 5.17 | 1 |
| 500 | 45.33 | 21.83 | 1 |
| 1000 | 78.67 | 42.67 | 1 |
| 1500 | 112.00 | 63.50 | 1 |
| 2000 | 145.33 | 84.33 | 1 |
| 2500 | 178.67 | 105.17 | 1 |

It is another advantage of the present invention that since tape backup, transportation, and restore processes are not needed, the costs of resources for these processes are eliminated.

It is another advantage of the present invention that data integrity is increased for several reasons. First, no tape backups or restores are needed, thus eliminating the exposures of data corruption, missing tapes, and out-of-sequence tapes. Second, no intermediate devices, such as tape drives or channel extenders, are needed. Data is transferred directly from the source DASD to the target DASD. This eliminates another exposure to data corruption. Finally, less manual intervention is needed than with the other methods. This minimizes the exposure to data corruption imposed by human error.

An advantage that the present invention has over the Physically Moving DASD Units method, in addition to greatly reduced application downtime, is that no exposure to physical damage is incurred.

An advantage that the present invention has over NDM is that it does not require prior configuration of the target mainframe. All system configuration and operating system data is migrated with data mirroring method of the present invention. Therefore, the target system does not require a new node identifier. The old data center identifier is migrated along with the data. In addition, the present invention moves entire volumes of data at once, rather than the dataset-by-dataset method required by NDM.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DESCRIPTION OF THE PREFERRED EMBODIMENTS

A. Best Mode of the Preferred Embodiment

1. SRDF Platform

The present invention solves the problems of migrating volumes of data from a source DASD in a primary data center to a remote, target DASD in a remote data center by using EMC's SRDF units to generate mirrored copies of the data.

Figure 1:
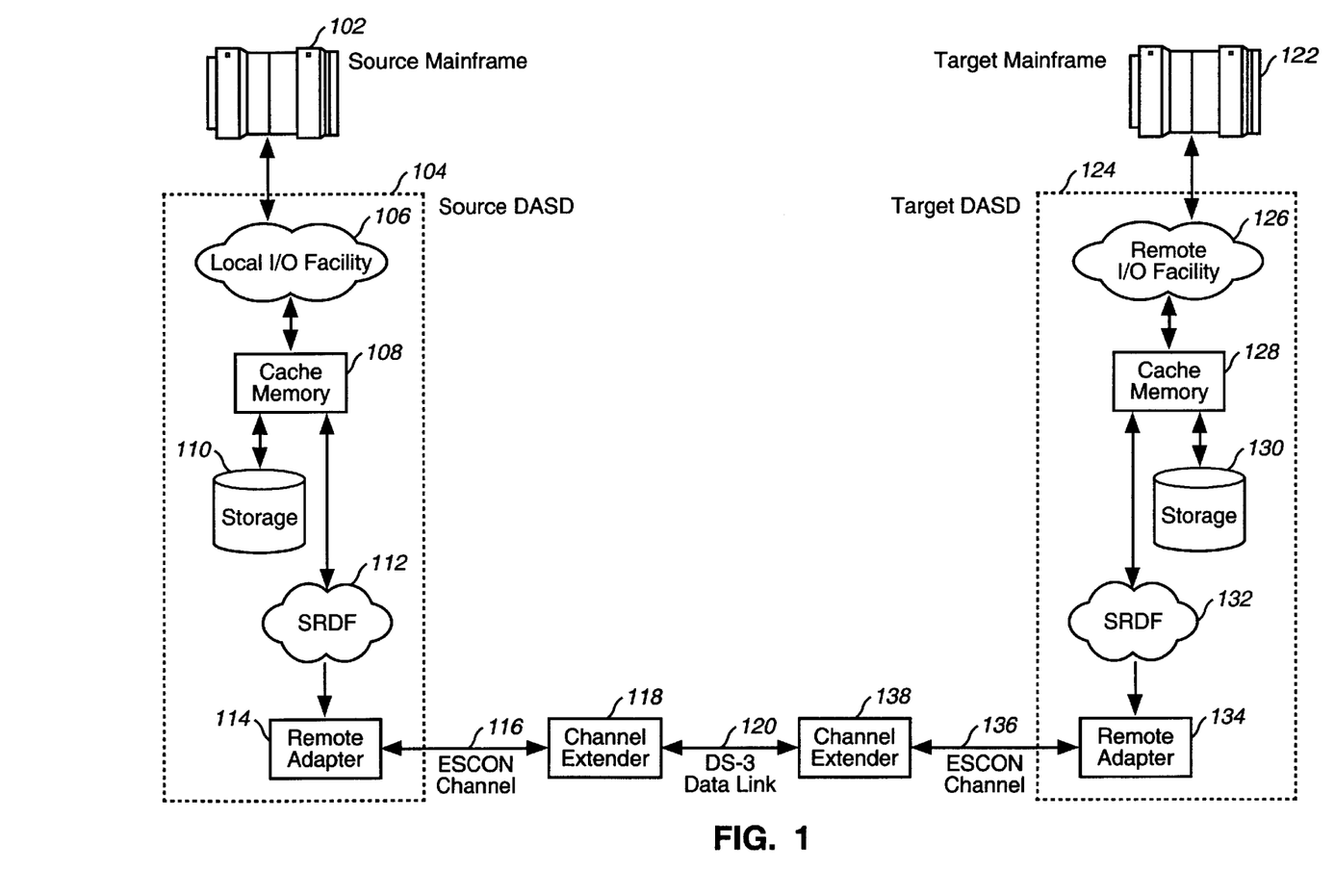
FIG. 1 is a system diagram illustrating the basic system architecture of a data center migration platform using EMC SRDF units.

FIG. 1 illustrates the system architecture of a data center migration platform using EMC SRDF units. This platform is a standard configuration for using the SRDF for the mirroring of data. A Source Mainframe 102 and Source DASD 104 represent the primary data center to be migrated, whereas a Target Mainframe 122 and Target DASD 124 represent the remote data center which is to received the migrated data. Both the Source DASD 104 and Target DASD 124 include an EMC SRDF unit 112, 132 in the preferred embodiment. The EMC SRDF unit it described in detail in the *SYMMETRIX Remote Data Facility (SRDF) Product Guide*, P/N 200.999-554 Rev. B, EMC Corporation, June 1995, 1st Edition, which is incorporated by reference in its entirety. The reference to EMC's SRDF is for convenience purposes only. It would be readily apparent to a person skilled in the relevant art to incorporate a unit similar to the EMC SRDF 112, 132.

The Source DASD 104 consists of a Local Input/Output (I/O) Facility 106, Cache Memory 108, and permanent Storage 110. The Local I/O Facility 106 processes transactions to and from the Source Mainframe 102. Cache Memory 108 is a fast storage buffer that writes the data processed by the Local I/O Facility 106 to Storage 110. Storage 110 represents permanent storage for all of the Source Mainframe 102 data.

For data mirroring or migration, an SRDF 112 is added to the Source DASD 104 for reading the data that is received into Cache Memory 108 and written to Storage 110. The SRDF 112 directs the data it has read to a Channel Extender 118. A Remote Adapter 114 is added to serve as a connection between the SRDF 112 and the Channel Extender 118.

An ECON Channel 116 serves as an external channel to a data network. ECON (Enterprise Systems CONnectivity) is a standard International Business Machine, Corporation (IBM) proprietary protocol for fiber optic connections between processors and storage. It connects the Source DASD 104 to the Channel Extender 118. The Channel Extender 118 converts the ECON Channel 116 to a DS-3 Data Link 120 for long distance communication of data. The DS-3 Data Link 120 transfers the data from the Source DASD 104 to the Target DASD 124.

At the target data center is the Target Mainframe 122 and Target DASD 124, which represents the system to which data on the Source Mainframe 102 is migrated. The Target DASD 124 is physically identical to the Source DASD 104. However, the SRDF 132 and Remote Adapter 134 on the Target DASD 124 are configured as slave (or target) units which are setup to respond to commands given by the master (or source) SRDF 112 and to receive data from the master SRDF 112. More details about the master and slave configurations are provided below.

Similar to the Source SRDF 112, the target SRDF 132 is connected also to an ECON Channel 136 and Channel Extender 138 via a Remote Adapter 134. The Channel Extender 138 connected to the Target DASD 124 is also connected to the Channel Extender 118 of the Source DASD 104 via the DS-3 Data Link 120. Thus, data is migrated from the Source DASD 104 to the Target DASD 124 via the DS-3 Data Link 120.

As application data updates are made on the Source Mainframe 102, they are received by the Local I/O Facility 106 on the Source DASD 104. This data is buffered to Cache Memory 108 which writes the data to Storage 110. As data is written to Storage 110, it is also processed by the SRDF 112 and sent to the Remote Adapter 114, which directs the data out through the ESCON Channel 116. The Channel Extender 118 then converts the data to a DS-3 Data Link 120 bitstream. The data is then routed via a DS-3 Data Link 120 network to the Channel Extender 138 at the target data center. The target Channel Extender 138 converts the data to an ECON Channel 136. The data is received by the SRDF 132 via the Remote Adapter 134 on the Target DASD 124. The SRDF 132 then places the data in the Cache Memory 128 on the Target DASD 124, which writes the data to Storage 130. The data is now available for use by the Target Mainframe 122.

When using the SRDF for mirroring data from a source to a target data center, data is first entered into the Source Mainframe 102 system's memory prior to being written to the Source DASD 104. Therefore, there is a time lag between when data is entered by the user, and when that data is mirrored on the Target DASD 124. This time lag introduces an exposure when mirroring data. At some point in time, use of an application on the Source Mainframe 102 must be cut over from the Source Mainframe 102 to the Target Mainframe 122. Any data that is caught between the memory stage and the DASD 104 stage on the source system when this occurs will not be reflected on the target system.

Data is copied via the DS-3 Data Link 120 one physical track at a time in a "bit-by-bit" method from the Local I/O Facility 106 directly to the Remote I/O Facility 126. This process is host transparent, and at no time is access restricted on the source data center. Application update processing can proceed on the source data center while mirroring is in process. No additional Source Mainframe 102 processing is required to copy data from the source data center to the target data center. Access to the data at the target data center is on a read-only basis while copying is occurring, or in a read-write access if a migration or recovery is in process. The source data center may use this feature to take advantage of the Target Mainframe's 122 resources, to balance workloads, to move applications to target data centers, or in support of cost reduction activities such as data center consolidation.

By using SRDF units 112, 132, application data is mirrored from the source data center to the target data center while maintaining application availability on the Source Mainframe 102. To cut the applications over to the target data center the only changes to be made are to the Source Mainframe's 102 processes and procedures (scheduling, remote access, etc.). Since the data is already at the Target DASD 124, cut over comprises deactivating the applications on the Source Mainframe 102 and an initiating or 'bringing-up' of the applications on the Target Mainframe 122. No time consuming tape dumps, transport and restores are required.

2. External SRDF Configuration: Master/Slave

At its most basic configuration as described above, the present invention must have one SRDF 112 configured as the master in a source data center, and a second SRDF 132 configured as the slave in a remote target data center. The master SRDF 112 is the primary data storage subsystem and initiates many of the SRDF synchronization activities. It oversees all control processing between itself and the slave (s) configured with it. A slave SRDF 132 is the secondary data storage subsystem and maintains synchronization with the master SRDF 112 with which it is paired. It communicates to one master SRDF 112 and processes control information back to the master to which it is attached. The slave SRDF 132 must be brought up prior to the master SRDF 112. When the master SRDF 112 is brought up, it establishes the master/slave relationship with the slave(s) connected with it. If there is an outage to the master SRDF 112 and the slave SRDF 132 received updates from the master, the master SRDF 112 re-makes those updates when the system is re-established to make all volumes synchronized.

The master and slave SRDFs 112, 132 are linked together via Remote Adapters 114, 134 that attach to ESCON Channel 116, 136 jumper cables hooked to Channel Extenders 118, 138 respectively. The Channel Extenders 118, 138 are attached to a dedicated DS-3 Data Link circuit 120. Data is transferred from the master SRDF 112 to the slave SRDF 132 using the Remote Adapters 114, 134.

The minimum DS-3 Data Link 120 required is one for each master-slave configuration, but for performance and back-up purposes two lines are recommended. If two DS-3 Data Link 120 lines are used and communication to one line is interrupted, data transfer continues on the other. If both lines fail, no writes are made to the Target SRDF 132, however, processing continues at the Source Mainframe 102. These lines must be clear channel and point to point. When determining the number of DS-3 Data Link 120 lines to use, it is important to remember that SRDF 112, 132 performance is directly related to the number of DS-3 Data Link 120 lines available to the configuration. Also, each SRDF 112, 132 unit in both data centers must be connected to a Channel Extender 118, 138 that converts the DS-3 Data Link 120 line to an ESCON Channel 116, 136. For example, MCI Communications Corporation (MCI) uses a DataSwitch 9800 Channel Extender 116, 138 that connects one or two DS-3 Data Link 120 lines to each EMC SRDF 112, 132 unit. It would be readily apparent to a person of ordinary skill in the relevant art to use an alternate Channel Extender 116, 138 and a different number of DS-3 Data Link 120 lines.

The number of outbound Remote Adapters 114 supported by an EMC SRDF 112 unit is four (4). These Remote Adapters 114 work concurrently and as the number used increases the aggregate mirroring time decreases.

3. Internal SRDF Configuration

All SRDF 112, 132 functions are managed at the internal logical level. That is, all volumes to be mirrored to a remote physical location are identified at the source/target level The external description is at the unit level only. The only direct relationship between the internal volume configuration and the external unit description is how the unit recovers after an outage.

Regardless of how each SRDF 112, 132 is set up, as a master or slave, the possible volumes types within each unit are described below. Each SRDF 112, 132 may have any combination of the types of volumes listed.

(i) Source: A source volume requires a corresponding target volume at the target data center to properly send data. These source volumes are mirrored to their respective target volumes in the target data center. If the source volume fails, the target volume is accessed by the Source Mainframe 102. When the failed volume is replaced, the mirrored pair are automatically synchronized as a transparent background operation. This is a read-write access from the Source Mainframe 102;

(ii) Target: A target volume is a mirrored copy of the source volume with which it is paired. These volumes receive data from their respective source volumes to maintain synchronization. This is read only access from the Source Mainframe 102; and (iii) Local: A local volume is an 'ordinary' volume residing in a source data center that does not have any SRDF capabilities enabled. Volumes are accessed only by the Source Mainframe 102. These volumes are unmirrored/unspared or internally mirrored to other volumes in that unit.

4. Data Transfer

Data is transferred between the Source DASD 104 and the Target DASD 124 in full track increments or I/O blocks. The master SRDF 112 maintains a track table that contains flags of valid or invalid for each source volume. An invalid flag means that the track in question has been updated on the Source DASD 104 and needs to be sent to the Target DASD 124. Once the track has been successfully transferred, the track is then labeled as valid. All target volumes are identical to source volumes when all tracks in the track table are flagged as valid.

The track table permanently resides in Cache Memory 108 on the Source DASD 104. The track table takes a static amount of cache regardless of the number of invalid tracks flagged. This table has all the track addresses that are SRDF enabled and a flag of valid or invalid that determines whether the track needs to be copied to the target volume or not. This is particularly important in semi-synchronous, or journaling, mode since this is the control that tells the SRDF 112 process which tracks need to be copied and which tracks do not. Both the master SRDF 112 and slave SRDF 132 have track tables. If the slave SRDF 132 is updated during an outage to the master SRDF 112, all tracks are marked invalid (or changed) on the slave SRDF 132. When the master SRDF 112 is brought back on-line, the master SRDF 112 processes the invalid tracks from the slave SRDF 132.

Figure 2:
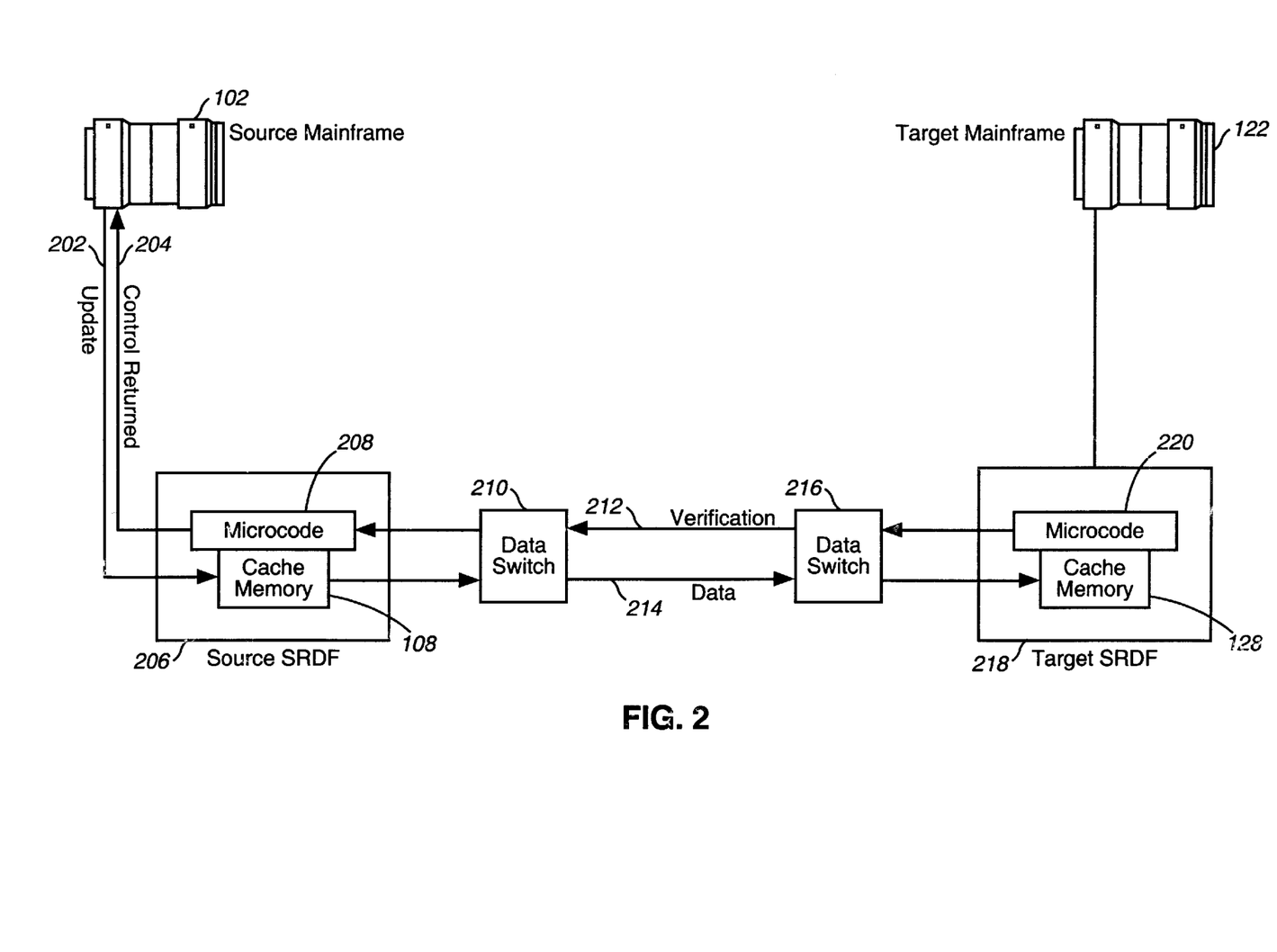
FIG. 2 is a system diagram illustrating the operational modes used for transferring data from a source mainframe to a remote target mainframe.

Data is transferred from the Source DASD 104 to the Target DASD 124 in one of two fashions: journaling mode and real time mode. FIG. 2 illustrates these operational modes.

In standard journaling mode, as updates 202 are initiated to tracks that reside in the Source SRDF 206, the Source SRDF microcode 208 performs cache verification and returns control to the Source Mainframe 102 along path 204 before the data write 214 is made to the disk drive. This is a cache fastwrite. Prior to de-staging the track from the source Cache Memory 108, the track is sent to the Target SRDF 218 as shown by the transfer of data 214. As the data write through path 214 is verified in the target Cache Memory 128 at the target data center, notification of verification is sent back to the Source SRDF 206 on path 212 that the track has been successfully received and is subsequently de-staged from the Cache Memory 108, 128 at both sites. If the Source SRDF 206 does not receive verification of a successful data transfer 214 within ten (10) seconds, the Source SRDF 206 marks that track as invalid, notifies the Source Mainframe 102 of its condition and initiates the data transfer 214 again.

Journaling mode can occur with or without a feature called adaptive copy. Adaptive copy enhances journaling mode by not restricting updates to the Target SRDF 218 to be only one data write behind. With adaptive copy, the Source SRDF 206 user can calibrate the level of synchronization from the master Source SRDF 206 to the slave Target SRDF 218. Due to network propagation delays that increase as the DS-3 Data Link 120 distance increases, this feature is very beneficial in minimizing any potential performance impact to the Source Mainframe 102 as the Source SRDF 206 tries to keep within one data write under standard journaling mode. The chosen embodiment of the present invention implements journaling mode with the adaptive copy feature because this feature does not impact data integrity when used for data migration purposes.

The data write 214 to the target SRDF 218 occurs through the data switches 210, 216. For purposes of FIG. 2, each data switch comprises a Remote Adapter 114, 134, Channel Extender 118, 138, and ESCON Channel 116, 136. This backend process is secondary to the data updates 202, thereby resulting in no response time degradation on the Source Mainframe 102 during the actual mirroring using the adaptive copy feature.

In real time mode, updates 202 are made to the Source SRDF 206 after which the microcode 208 verifies the Cache Memory 108. Prior to returning control 204 to the Source Mainframe 102, the microcode 208 transfers the track of data 214 to the Target SRDF 218. Upon subsequent verification that the track has been successfully updated in the Target SRDF 218, the microcode 208 returns control to the Source Mainframe 102. Thus, applications on the Source Mainframe 102 resume processing 204 only after the previous data update 202 has been transferred on path 214 to the Target SRDF 218 and verified via path 212.

Because volumes at the source and target data center are always fully synchronized prior to the completion of a write operation, writing of the source application updates 202 to the mirrored volumes on the Target SRDF 218 experiences response time delays.

The Source SRDF 206 participating in data center migration has the ability to read and write data to either the volumes in the Source DASD 104 or the volumes in the Target DASD 124. Communication is managed through the DS-3 Data Link 120 lines and controllers of each unit. If a source volume in a Source DASD 104 becomes corrupted or disabled, the Local I/O Facility 106 automatically processes all reads and writes to the Target DASD 124. As writes are made to a target volume, the Remote I/O Facility 126 begins to update its track table and collects a series of invalid tracks. These invalid tracks will be sent from the Target DASD 124 to the Source DASD 104 when the source volume is replaced.

Processing data on the Target DASD 124 only occurs if the Source DASD 104 is active and available. If the entire Source DASD 104 becomes disabled, visibility to the Target DASD 124 becomes lost.

5. SRDF Operational Flow for Data Migration

In order to eliminate this exposure and ensure that all source application updates on the Source Mainframe 102 are reflected in the Target DASD 124, the present invention comprises a new process to use the EMC SRDF for a data center migration.

Figure 3:
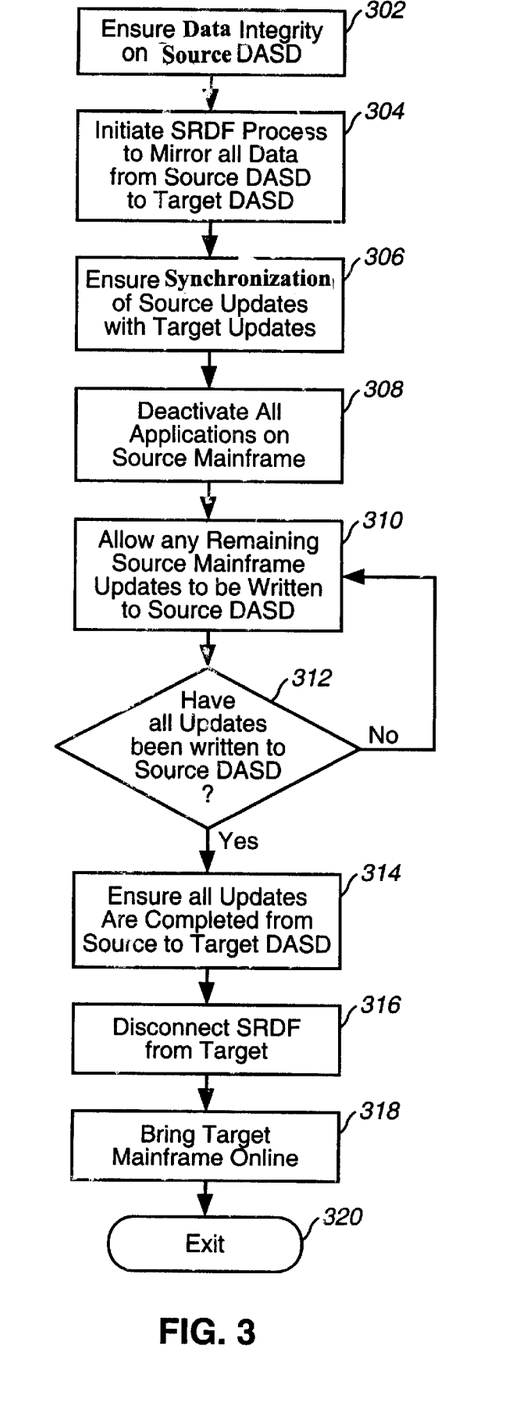
FIG. 3 is a control flow diagram illustrating the operational flow of a data center migration platform using SRDF units.

FIG. 3 is a control flow diagram illustrating the operational flow of a data center migration platform using SRDF units. The present invention ensures all source application data updates are migrated, data integrity is maintained, and application downtime is minimized.

Prior to data migration, the process begins at step 302. In step 302, an operator of the source SRDF 112 ensures data integrity on the Source DASD 104 to verify that all data to be migrated is complete and stored on the Source DASD 104. After step 302 completes, the operator proceeds to step 304 and initiates the SRDF 112 processing. In step 304, the SRDF 112 initiates the data mirroring process, in which data updates from the Source Mainframe 102 are written to the Target DASD 124. The SRDF 112 also initiates a process which reads data already written on the permanent Storage 110 of the Source DASD 104 for transfer to the Target DASD 124. The SRDF 112 transfers the data it receives from both Storage 110 and Cache Memory 108 to the Target DASD 124 via the Remote Adapter 114. After step 304 is initiated and concurrent with its execution, the SRDF 112 continues to step 306. In step 306, the SRDF 112 verifies the synchronization of updates on the Source DASD 104 with the same updates on the Target DASD 124 to ensure that the data mirroring is proceeding as planned. Thus, steps 304 and 306 execute concurrent with each other.

After the data on the Storage 110 has been transferred to the Target DASD 124 and prior to performing the actual data center migration the operator of the Source Mainframe 102 proceeds to step 308. In step 308, the operator deactivates all applications on the Source Mainframe 102. This disables any more updates from being made on the Source Mainframe 102. The operator then continues to step 310. In step 310, the remaining updates from the Source Mainframe 102 are written to the Source DASD 104, thus mirrored to the Target DASD 124, prior to cutting over from the source applications to the Target Mainframe 122 applications. This time is required because there is a time lag between updates being entered on the Source Mainframe 102 and being written to the Source DASD 104. As the updates are written to the Target DASD 124, the operator continues to step 312. In step 312, the operator determines if all of the remaining updates have been written to the Source DASD 104. The operator makes the determination of step 312 by viewing the SRDF 112, 132 activity or utilization levels. If there are remaining updates, the process returns to step 310.

Referring again to step 312, when the operator determines that all updates have been written to the Source DASD 104, the operator proceeds to step 314. In step 314, the operator confirms that all updates have been completed on the Target DASD 122. When the updates have been confirmed, the operator continues to step 316. In step 316, the SRDF 112 is disconnected from the Target DASD 124. Continuing to step 318, an operator brings the Target Mainframe 122 online and initiates execution of the applications on the Target Mainframe 122. After step 318, the data center migration is complete; therefore, the present invention continues to step 320 and its processing exits.

The specifications in the above description should not be construed as limitations on the scope of the invention, but rather as specifications of the preferred embodiment. Other obvious variations and modifications are possible and are readily apparent to persons skilled in the relevant art.

6. Performance

Regardless of the performance metric being used (DASD response times, application response time, etc.), performance is a function of the number of DS-3 Data Link 120 connections available to each Channel Extender 118, 138 plus the distance the data is being mirrored. The amount of data on each volume also effects the aggregate speed in which a volume is copied or mirrored from the Source 104 to the Target 124 DASD.

Another key to performance for the source applications executing on the Source Mainframe 102 is whether the mirroring mode is journal, journaling with adaptive copy, or real time mode. Real time mode provides maximum data integrity and protection since there are a minimal number of tracks 'in flight' along path 214 to the Target SRDF 218. The penalty is that a source application executing on the Source Mainframe 102 cannot continue its processing until verification via path 212 is received from the Target SRDF 218 completing the data write along path 214, thereby experiencing performance delays.

7. Sizing

The amount of DASD required is a function of the applications being migrated or mirrored. Table 4 describes the total time it would take to mirror volumes for the first time, whereas Table 5 shows the estimated times for sending a track update after the mirroring is completed. Using the information below, one can estimate the time required for processing data mirroring. These estimates are a direct function of the number of DS-3 Data Link 120 lines available. An increase in DS-3 Data Link 120 lines gives a proportionate increase in performance for mirroring. Another key factor in estimating the time required to mirror volumes is the distance between the source and target data centers.

TABLE 4

Volume Mirroring Estimation

| Source EMC units | Minimum DS-3s (total) | Maximum DS-3s (total) | Concurrent volumes mirrored (Min) | Concurrent volumes mirrored (Max) | Volume Mirroring Time (Total)* | Avg Volume Mirroring Time (Min config) | Avg Volume Mirroring TIme (Max config) |
|---|---|---|---|---|---|---|---|
| 1 | 2 | 4 | 2 | 4 | 35 min | 17.5 min | 8.75 min |
| 2 | 4 | 8 | 4 | 8 | 35 min | 8.75 min | 4.38 min |
| 3 | 6 | 12 | 6 | 12 | 35 min | 5.83 min | 2.92 min |

Using the number of volumes to be mirrored and the configuration chosen, the total first time mirroring time can be estimated as follows:

# of volumes×Avg volume mirroring time=total mirroring time.

TABLE 5

Track Mirroring Time

Journaling Mode - 400 miles
(Mod 3 volumes)

| | MB transferred (minute) | Tracks transferred (minute) | Track Transfer Time (seconds) |
|---|---|---|---|
| 1 3390-mod 3 track | 56.3 | 970 | .062 |

8. Maintaining Data Integrity

EMC's SRDF does not maintain logical data integrity, but only maintains physical data integrity between a source and target volume. The implication in journaling mode is that at any point in time there are several tracks in flight across the DS-3 Data Link 120 lines keeping the target volumes synchronized with the source volume while updates are happening to the source volumes. When it is necessary to access the target data from the Target SRDF 218 it is necessary to deactivate all processing on the Source Mainframe 102 and allow all track updates to be successfully sent from the source to the target.

If real-time synchronous processing is selected, then at no time should any tracks be in flight while processing is occurring on the source side. In this mode if a hardware error or data center outage occurs during the mirroring process, the application running at the source site can be initiated at the remote site. The source site can access the remote site with little or no data loss.

9. Remote access

The present invention requires a unique volume catalog on the Source DASD 104 that is mirrored to the Target DASD 124. The first step in target data center processing is to connect the 'mirrored' catalog to the Target Mainframe 122. Once this has been accomplished, all data on the Target SRDF 218 is available through volume catalog processing.

Storage Management is responsible for taking the list of datasets going from source to target and building a unique user catalog that will be mirrored to the target site.

10. Migration

All data files of the applications being moved need to be identified and sized. Sizing is determined by the number of EMC SRDF 112, 132 units in addition to the number of DS-3 Data Link 120 lines to move the data in an acceptable timeframe.

Once the files have been identified, an SRDF 112 process is initiated at step 304 to move the selected files to the Target SRDF 218, and in addition, to set up a separate user catalog to track the datasets properly once they have been mirrored.

11. Select Hardware Configuration

Table 6 shows the minimum standard hardware configurations for implementing a SRDF data center migration platform.

TABLE 6

Minimum Standard Hardware Configuration

| Hardware | Description | Details |
| --- | --- | --- |
| 1 EMC 5500-xxxx in each data center | Source and Target DASD devices that attach remotely via the network. | The SRDFs do not have to be identical, however, the slave SRDF needs at least the same number of logical volumes as the master. 2 Remote Adapter links are needed to attach to DataSwitch units. |
| 2 DS-3 Data Link lines | This is a 51 Mbps fiber optic line that will connect the source and target data centers. | Must be Point to point between each center; 51 Mbps clear channel. |
| 1 DataSwitch 9800 system in each site | This system converts the DS-3 line to an ESCON channel that attaches to the EMC unit. | 1 system consists of a DataSwitch 9800 converter and a diagnostic PC. |

One EMC SRDF must be the master SRDF 112 and the second SRDF must be the slave SRDF 132. In most cases the master SRDF 112 contains only source volumes and the slave SRDF 132 contains only target volumes. There is a one-for-one source to target relationship at the logical volume level.

Master and slave unit volumes that will be mirrored using SRDFs 112, 132 must be mapped. The Head Disk Assembly (HDA) that a volume is stored on (physical address) must be identified along with the operating system Unit Control Block (UCB). After these items are known the logical addresses of both the source and target volumes must be determined. The physical and logical addresses of the source volumes do not have to match the target volumes.

B. Beta Test Site for SRDF Data Migration: Rockville, Md. to Omaha, Nebr.

MCI became the beta test site for migrating a data center from Rockville, Md. to Omaha, Nebr., a distance of 1,700 miles. The project was initiated for the explicit purpose of testing the present invention. The project came to a close on May 28, 1995 with the successful transfer of 1.5 Terabytes of data from Rockville to Omaha, thereby proving the viability of EMC SRDF and the present invention as an application migration and data transfer tool.

The beta test achieved tremendous results. In particular, 50,450 tracks of data were transferred every thirty (30) minutes which translates to 1.6 Megabytes of data per second on each DS-3 across the 1700 miles. The estimated time to mirror the data from Rockville to Omaha was approximately thirty-five (35) hours, however, the present invention delivered the data to Omaha four (4) hours ahead of schedule. It is important to note that the thirty-one (31) hours was not outage time because the applications on the source computer system in Rockville were still active and processing during the mirroring process.

C. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for migrating volumes of data supporting a source data center, comprising a source mainframe and a source DASD, to a target data center, comprising a target mainframe and a target DASD, to support the migration of one or more applications from the source mainframe to the target mainframe, comprising the steps of:

(a) verifying data integrity on the source DASD;

(b) initiating one or more processes to mirror the volumes of data from the source DASD to the target DASD, and to mirror one or more data updates to the volumes of data by the applications of the source mainframe to the target DASD;

(c) synchronizing said data updates to the volumes of data by the applications of the source mainframe with corresponding data updates to the target DASD;

(d) deactivating the applications of the source mainframe;

(e) mirroring one or more remaining data updates to the volumes of data by the applications of the source mainframe to the target DASD;

(f) disconnecting the source data center from the target data center; and (g) bringing the target data center on-line and initiating the applications of the target mainframe.

2. A data migration system for migrating volumes of data supporting a source data center, comprising a source mainframe and a source DASD, to a target data center, comprising a target mainframe and a target DASD, to support the migration of one or more applications from the source mainframe to the target mainframe, comprising data integrity means for verifying data integrity on the source DASD;

first mirroring means for initiating and executing one or more processes to mirror the volumes of data from the source DASD to the target DASD, and to mirror one or more data updates to the volumes of data by the applications of the source mainframe to the target DASD;

synchronization means for synchronizing said data updates to the volumes of data by the applications of the source mainframe with corresponding data updates to the target DASD;

deactivating means for deactivating the applications executing on the source mainframe;

second mirroring means for mirroring one or more remaining data updates to the volumes of data by the applications of the source mainframe to the target DASD;

disconnecting means for disconnecting the source data center from the target data center; and on-line means for bringing the target data center on-line and initiating the execution of the applications on the target mainframe.

3. A data migration system according to claim 2, wherein the source DASD and target DASD each comprise a Symmetrix Remote Data Facility.

* * * * *